J. N. WHEELER.
CHILD'S SPEED CAR.
APPLICATION FILED JUNE 10, 1909.
961,370.
Patented June 14, 1910.
2 SHEETS—SHEET 1.
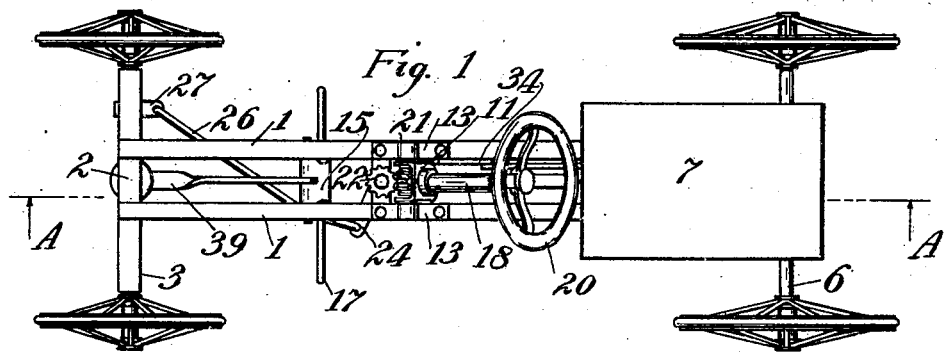
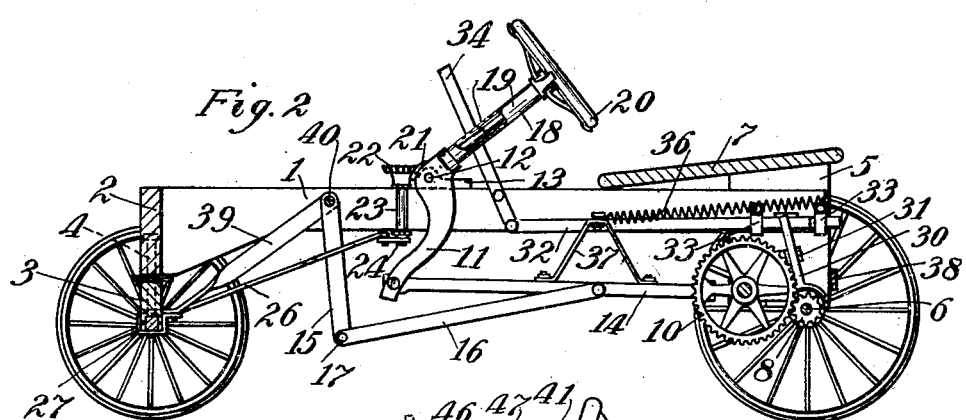
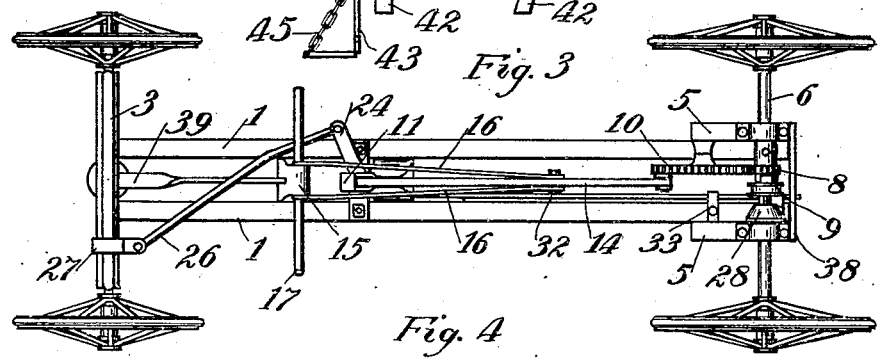
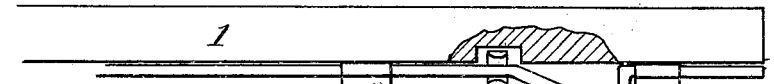
Witnesses:
Erwin Phelps
Nettie M. Pierce
Inventor:
Joel Niles Wheeler
By Rummler & Rummler,
Attorneys.

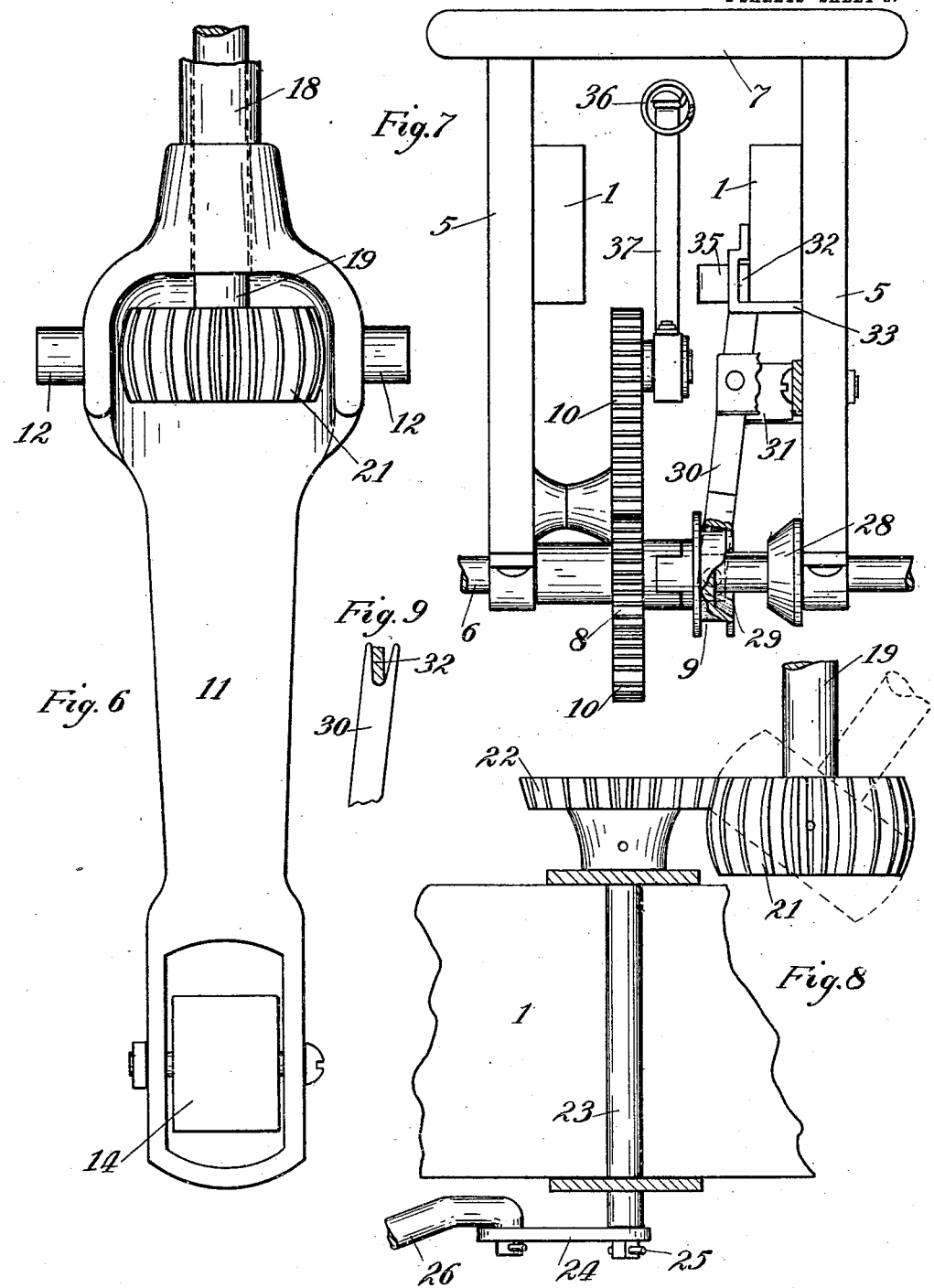
J. N. WHEELER.
CHILD'S SPEED CAR.
APPLICATION FILED JUNE 10, 1909.
961,370.
Patented June 14, 1910.
2 SHEETS—SHEET 2.

UNITED STATES PATENT OFFICE.

JOEL NILES WHEELER, OF GENEVA, ILLINOIS.

CHILD'S SPEED-CAR.

961,370.　　　　Specification of Letters Patent.　　Patented June 14, 1910.

Application filed June 10, 1909. Serial No. 501,270.

*To all whom it may concern:*

Be it known that I, JOEL NILES WHEELER, a citizen of the United States of America, and a resident of Geneva, county of Kane, State of Illinois, have invented certain new and useful Improvements in Children's Speed-Cars, of which the following is a specification.

The main objects of this invention are to provide improved means for propelling a vehicle whereby the full power of the arms, legs and body of the operator are utilized to produce maximum propelling effect; to provide an improved form of steering mechanism adapted to be operated by a hand-wheel or lever and so related to the driving mechanism as to be under the control of the operator at all times without interfering with the full use of the arm muscles in operating the driving mechanism; to provide improved clutch-and-brake mechanism particularly adapted for vehicles of this class; and to provide improved means whereby power may be stored up during the outward thrust of the legs, and be given up to the driving mechanism while the legs are being retracted, and whereby the driving mechanism will be prevented from stopping on a "dead center".

Other objects are to provide a form of driving mechanism for children's cars which will tend to produce a symmetrical and balanced development of a child's body, instead of the unequal development which must necessarily result where the exercise is limited to but one part of the body, as in the usual form of wagons and cars operated wholly by the arms or wholly by the legs; and to provide a form of car which is designed to meet the desire, now prevalent among children, to have an imitation of a real automobile, as near as may be within the child's mechanical ability to use and the parent's ability to buy; hence the provision of a steering wheel, and of a lever operating a clutch-and-brake mechanism, having "driving" and "braking" positions and allowing the middle or "neutral" position for coasting and for satisfying the child's pretense of "cranking up", all, of course, embodied in simple and inexpensive construction.

A specific embodiment of this invention is disclosed in the accompanying drawings in which,—

Figure 1 is a top plan of a child's speed car construction according to this invention. Fig. 2 is a sectional side elevation of the same, the section being taken on the line A—A of Fig. 1. Fig. 3 is a bottom plan of the same. Fig. 4 is an enlarged detail of the clutch-and-brake shifting-rod. Fig. 5 is a detail of the seat which is adapted to be removably attached to the car. Fig. 6 is an enlarged detail of the lower part of the hand-lever, the upper part being broken away. Fig. 7 is an enlarged rear view of the car, some of the parts being omitted and others being broken away. Fig. 8 is an enlarged detail of parts of the steering mechanism. Fig. 9 is a detail illustrating the sliding connection between the clutch-shifting-rod and the clutch-lever.

In the construction shown in the drawings the frame of the car comprises a pair of reaches 1 spaced apart at the front by the bolster-block 2 to which the front axle 3 is pivotally connected by the king-bolt 4. Upright side members 5 are secured to the reaches 1 at the rear end thereof and extend both above and below the reaches. The rear axle 6 is journaled in bearings on the bottom of the members 5, and the seat 7 is secured across the top of the members 5.

The driving mechanism comprises a pinion 8 rotatably mounted on the rear axle 6 and having a clutch-face coacting with a clutch-member 9, which is splined to the rear axle and shiftable into and out of engagement with the clutch-face of the pinion. The pinion 8 meshes with a driving gear 10 journaled on one of the members 5 and provided with a crank-pin for connection with a pitman. An oscillating hand-lever 11 is mounted on trunnions 12 which are journaled in suitable stationary bearings 13 on the reaches 1, and its lower end is connected by the pitman 14 to the pin on the gear 10. The foot-lever 15 is pivoted to the reaches 1 in front of the lever 11, and is connected to the pitman 14 by the double link 16. A rod 17 serves as a pivot between links 16 and the lever 15, and its ends project outwardly at both sides so as to serve as the treadles.

The steering mechanism comprises a tubular part 18 which is secured to and forms a part of the lever 11. Adjacent to its trunnions, the lever 11 is enlarged and hollowed out to form a kind of shell, which is open at the front. The steering-shaft 19 is journaled in the tube 18 and has a steering-wheel 20 secured to its upper end. This wheel serves both as a steering-wheel and as a handle for oscillating the lever 11. The wheel 20 is preferably made of wood to imitate the steering-wheel of an automobile. A specially shaped spherical gear 21, which might be called "globular gear" is mounted upon the lower end of the shaft 19 and is partially housed in the hollow shell-like part of the lever 11. The gear 21 is shaped like the middle or principal segment of a sphere, and has formed upon it teeth whose sides are bounded by great circles or meridians whose planes intersect in the axis of rotation. The teeth are, therefore, thicker in the middle than at their ends; but this variation in thickness of the teeth is negligible in practice, particularly when the teeth with which they mesh are also specially formed as on the gear 22. The gear 22 is of inverted frusto-conical form and is mounted on the shaft 23 which is journaled so that its axis is stationary with respect to the frame and with respect to the axis of the trunnions 12. The gears 21 and 22 are positioned so that when the shaft 19 is vertically disposed, the gear 22 is above the equator of the gear 21, preferably with their upper faces in the same horizontal plane. The gear 21 is located so that its center lies substantially within the axis of the trunnions 12. As the axis of oscillation of the lever 11 intersects the axis of rotation of the shaft 19 in the center of the globular gear 21, either oscillation or rotation of the shaft 19 may occur alone or both may occur simultaneously without disturbing the meshing or driving relation of the gears 21 and 22. Within the limits of the oscillation of the lever 11, which, according to my present practice, is usually about 35 degrees, the gears 21 and 22 can be made so that there is practically no lost motion due to the varying thickness of the teeth of the gear 21.

In the form shown, the lower end of the shaft 23 is squared (see Fig. 8), and the arm 24 has a square aperture therein to fit the squared end of the shaft 23, being held in place by the pin 25. A link 26 connects the arm 24 with a clip 27 secured to the front axle 3. The link 26 crosses the center line of the car so that the front axle turns on the king-bolt in the same direction as the steering-wheel is turned.

The friction-brake mechanism comprises a conical member 28 secured to the frame of the car concentrically with the rear axle 6. The clutch-member 9 has a concave conical socket 29 in the side adjacent to the member 28 and fitting the latter so as to retard the rotation of the axle when said parts are engaged.

The clutch-and-brake operating mechanism comprises a lever 30, which is pivoted to a bracket 31 secured to the frame of the car and which has one end forked so as to span and engage the clutch-member 9. The other end of the lever 30 is slotted to receive the bar 32 which is slidable longitudinally of the frame in the guides 33. The forward end of the bar 32 is pivoted to a hand-lever 34 which is pivotally supported on one of the reaches 1. Near its rear end the bar 32 is offset at 35 so as to swing the lever 30 as the result of a longitudinal shifting of the bar 32. When the lever 34 is in its forward position, the clutch is closed and the slotted end of the lever 30 is at the foot of the inclined offset 35. As the hand-lever 34 is pulled rearwardly, the slotted end of the lever 30 travels outwardly along the incline and thereby opens the clutch. The clutch is open when the slotted end of the lever 30 is near the middle of the inclined part of the offset 35, and is closed when the lever engages the bar 32 at a point in front of the offset 35. Further forward movement of the bar 32 causes the conical friction-socket 29 to approach the conical member 28, and as these friction surfaces come into contact a "braking" effect results.

The spring 36 is connected between the frame and the bracket 37 on the pitman 14, and has several novel functions. With the forward movement of the pitman, energy is stored up in the spring 36 which is utilized on the return movement in pulling the pitman toward the rearward limit of its travel. The height and position of the bracket 37 causes the pull of the spring 36 to be so directed as to prevent the driving crank from stopping on a "dead center" with respect to the propelling mechanism. If the car is left unoccupied on an inclined road, the spring will prevent it from running away.

In order to add rigidity to the frame, there is a brace 38 extending across the rear of the depending side members 5 which carry the driving mechanism; and there is also a brace 39 extending from the lower end of the king-bolt 4 to the pivot bolt which serves as a fulcrum for the foot-lever 15.

A trundle seat, which may be used for carrying either bundles or an extra passenger, is arranged to be mounted at the front end of the reaches. This seat is shown in Fig. 5 and comprises a seat 41 with side and back parts and having depending lugs 42 which fit between the reaches. There is a folding foot-rest 43 hinged to the front edge of the seat at 44 and supported in the position shown in Fig. 5 by means of a chain 45. Hooks 46 are provided for securing this foot-rest in a raised and folded position so as to form a closure for the front of the seat-box 41, as indicated by dotted lines in Fig. 5. Slots 47 in opposite sides of the seat-box serve as places of attachment for a strap for securing a small child in the seat.

The operation of the device shown is as follows: As will be understood from the foregoing description, the driving mechanism is operated by oscillating the hand-lever 11 and the foot-lever 15. The operator sits upon the seat 7 and grasps the steering wheel 20 with both hands while his feet rests upon the treadles 17. As the power is applied by a forward kick or thrust of the legs at the same time that the hand wheel 20 is pulled back, there is no tendency of the operator to slide on his seat. During the forward kick of the feet and the backward pull of the hands the spring 36 stores up a part of the energy exerted and assists the forward thrust of the hands and overcomes any weight of the feet resting on the treadles during the return movement of the pitman. The combined result is an easy and efficient application of the power of the operator's arms and legs, as well as that of the muscles of his back. It will be seen from Fig. 2 that the arms of both of the levers 15 and 11 which are connected with the pitman are disposed in the best position for efficient crankage, both of said levers being shown at the forward limit of their movement in Fig. 2. The action of the spring 36, through the fact that it is connected with the pitman 14 by the bracket 17, tends to urge the rearward end of the pitman downward and rearward, and thereby shifts the pitman 14 to a rearward position below the rearward dead point when the vehicle is unoccupied or when the clutch is open. This insures that the car may always be started forward by means of its driving mechanism without first pushing it along the ground to carry the pitman past dead center, as is usually necessary in devices of this character.

The steering operation is accomplished without releasing the hands from the steering-wheel and regardless of position of the operating levers, the rotation of the hand-wheel being communicated through the shaft 19, the gears 21 and 22, and so on through the link 26 to the front axle.

When the clutch-lever 34 is in the position shown in Fig. 2, the clutch-members are in their engaged position. If it should happen that while the vehicle is occupied the operator should stop it in a position where the pitman is at one of its dead points, then all that is necessary for him to do is to pull the clutch-lever 34 back to a position about midway between the limits of its movement. This, through the action of the inclined offset in the bar 32, opens the clutch. The spring 36 then causes the pitman to be pulled a little distance away from its dead point so that the operator may either shift the hand-lever so as to bring the pitman to a position for efficient starting crankage, or he may operate the hand-lever and foot-levers in the pretense of "cranking his engine" for the purpose of starting it. While the so-called "cranking" operation is in progress, the clutch-lever 34 may be thrown forward to cause engagement of the clutch, and the machine will at once start off, like a real automobile.

When the clutch-lever 34 is pulled back to its extreme rearward position, the clutch-member 9 will have been carried into engagement with the brake-cone 28 and will tend to stop the car.

From Fig. 8 it will be seen that the hand-lever which carries the shaft 19 may be oscillated through a considerable angle without disturbing the meshing relation between the globular gear 21 and the conical gear 22. In practice it is found that within the limits of the oscillation of the lever 11, about 35 degrees, the variation in thickness of the teeth of the globular gear 21 does not affect the efficient operation of the gear 22 for any of the positions of the lever 11. In fact, when ordinary care is used in the making of the gears, there is no more back lash or lost motion than is found in ordinary spur gears.

Important advantages of the herein described construction, are its effect upon the muscular development of the child as compared with that of other cars, for the use of children. Where a car requires but the single power of the hands in pulling a lever, or of the feet in operating treadles, the tendency is not only to cause the child to be shoved about in his seat in operating the propelling mechanism, but also to produce a muscular development confined wholly to the arms or wholly to the legs. With the herein described construction, the result is a balanced and symmetrical development of the whole body of the child, for the reason, that in the act of pulling backward, on the hand-wheel, while thrusting forward on the treadles, the child uses the muscles of his arms and legs and also those of his back and hips. The fact that he continues pulling and pushing during the steering operation in causing the arms to twist, also develops many of the muscles of the arms which are not developed where the motion is purely a reciprocating motion.

In most other cars for use of children the operating lever is fulcrumed at its lower end, with the pitman connection between the fulcrum and power, thus compelling a long sweep of the arms and body and doubling the child up in the stomach and rounding his back. The placing of the fulcrum between the power and the pitman connection, and the disposition of the operating lever, as herein shown and described, all serve to allow the child to lean back, never cramping the stomach nor interfering with easy breathing. When the lever has the shape and disposition herein shown, the child is caused to substitute for a mere backward pull of the backbone, the use and consequent development, of nearly all of the muscles of the arm which are called upon, first to pull directly backward while the wheel-post is vertical, and then to depress the wheel-post, the first part of the stroke calling for exercise of the back almost wholly, while the latter part calls for a downward pull which requires almost solely the arm muscles. In the forward stroke corresponding muscles on the other side of the arms are used, and the stroke ends in a horizontal push. Throughout both of these strokes the direction of movement is of constantly changing angle, which is also a point of considerable advantage when considered from the standpoint of muscular development.

In the system of levers shown, the tendency of the treadle action to push the body of the operator backward and the tendency of the hand lever to pull the body forward offset each other, thereby avoiding any lost motion due to sliding of the body on the seat, and at the same time providing an efficient application of power, calling out the most complex correlations and coöperations of the muscles of the entire body. Even the grip of the fingers upon the wheel serves to exercise the wrist and forearm at the same time that the lever is being used for power purposes; the grip is not relaxed, nor the pull of the arm lessened, even while making the sharpest turn, with one hand advanced and the other brought back by the turn of the wheel; the pull on the lever calls on the tortional and many other seldom used muscles in the forearms and wrist and develops them symmetrically. There is also much advantage in the new form of gearing, which permits of the required universal movement of the steering shaft during the oscillation of the hand lever. The mechanism shown is vastly superior to the Hooke joint which is usually used where universal movement is desired. The gears are powerful in all positions of the hand lever, while on the other hand there is no position in which a Hooke joint is powerful; the gears are durable, since large surfaces have to be worn away before lost motion arises, whereas the pins of the Hooke joint receive all of the wear and all of the strain and soon wear loose and permit lost play. The fact that most of the wear of the gears of this construction is confined to a quadrant of about 90 degrees on the two gears makes it possible, by using the square connection between the shaft 23 and the link 24, to turn said gears 90 degrees and thereby change the points of wear from time to time and give the gear a life at least four times that which would result if the gears were merely sectors. This is another point of vast superiority of the universal joint herein shown over the Hooke joint wherein the wear is throughout every part of the joint when the joint is in use at all.

The clutch mechanism allows of driving, coasting, and braking positions, and the clutch operating mechanism, while extremely simple, is nevertheless of such character that it will positively remain in its clutching position and will not slip out of clutching position and act as a brake, excepting through the exercise of the will of the operator. The brake, on the other hand, cannot become set, but the tendency of the braking mechanism is always to release itself as the clutch-lever tends to work down the incline of the bar 32 rather than up, due to the fact that the weight of the lever arm 34 tends to urge the bar 32 rearwardly.

Although but one specific embodiment of this invention is herein shown and described, it will be understood that numerous details of the construction shown may be altered or omitted without departing from the spirit of this invention.

I claim:

1. The combination of a vehicle frame mounted on wheels, a hand-lever fulcrumed to oscillate on a stationary axis on said frame, pitman mechanism actuated by said lever for propelling the vehicle, a shaft journaled on said lever and adapted to oscillate therewith, means at the upper end of said shaft for rotating it, a globular gear on said shaft having a substantially spherical pitch surface and having its center located substantially in the axis of oscillation of said shaft, a second gear journaled to rotate about a stationary axis on said frame and meshing with said globular gear, and means actuated by said second gear for steering the vehicle.

2. The combination of a vehicle frame mounted on wheels, a hand-lever fulcrumed to oscillate on a stationary axis on said frame, pitman mechanism actuated by said lever for propelling the vehicle, a shaft journaled on said lever and adapted to oscillate therewith, a hand wheel at the upper end of said shaft for rotating it, a globular gear on said shaft having a substantially spherical pitch surface and having its center located substantially in the axis of oscillation of said shaft, a second gear journaled to rotate about a stationary axis on said frame and meshing with said globular gear, and means actuated by said second gear for steering the vehicle.

3. The combination of a vehicle frame mounted on wheels, a hand-lever fulcrumed to oscillate on a stationary axis on said frame, pitman mechanism actuated by said lever for propelling the vehicle, a shaft journaled on said lever and adapted to oscillate therewith, means at the upper end of said shaft for rotating it, a globular gear on said shaft having a substantially spherical pitch surface and having its center located substantially in the axis of oscillation of said shaft, a conical gear journaled to rotate about a stationary axis on said frame and meshing with said globular gear, said conical gear being located so as to be at one side of the equatorial plane of said globular gear when the axes of said gears are substantially parallel, and means actuated by said conical gear for steering the vehicle.

4. The combination of a vehicle frame having front and rear axles, an operating lever comprising a shell, horizontally disposed trunnions on said shell journaled to oscillate on a fixed axis on said frame, a depending arm and an upwardly extending tube rigidly connected with said shell, a shaft rotatably mounted in said tube, a steering-wheel on the upper end of said shaft, and a globular gear on said shaft partly housed within said shell, a second gear journaled to rotate on a stationary axis on said frame and meshing with said globular gear, pitman mechanism connection between said depending arm and said rear axle, and means connecting said second gear with the front axle for steering the vehicle.

5. The combination of a vehicle frame mounted on wheels, an oscillating hand-lever fulcrumed on a stationary axis on said frame, pitman mechanism actuated by said lever for propelling the vehicle, a shaft journaled on said lever and adapted to oscillate therewith, means at the upper end of said shaft for rotating it, a globular gear on said shaft having a substantially spherical pitch surface having its center located substantially in the axis of oscillation of said shaft, a second gear journaled on said frame and meshing with said globular gear, and means actuated by said second gear for steering the vehicle, said second gear being adjustable angularly with respect to said last named means for the purpose of shifting the wear to different parts of said gears, and means limiting the adjustment of said second gear to certain predetermined angular positions.

6. The combination of a vehicle frame mounted on wheels, an oscillating hand-lever fulcrumed on a stationary axis on said frame, pitman mechanism actuated by said lever for propelling the vehicle, a shaft journaled on said lever and adapted to oscillate therewith, means at the upper end of said shaft for rotating it, a globular gear on said shaft having a substantially spherical pitch surface having its center located substantially in the axis of oscillation of said shaft, a second gear journaled on said frame and meshing with said globular gear, a shaft for said second gear having one end squared, an arm secured to said squared end, and a link connecting said arm with the front axle of said vehicle, said second shaft being adapted to be turned with respect to said arm for shifting the wear to different parts of said gears.

7. The combination of a vehicle frame mounted on wheels, a hand-lever fulcrumed to oscillate on a stationary axis on said frame, pitman mechanism actuated by said hand-lever for propelling the vehicle, a shaft journaled on said lever and adapted to oscillate therewith, means on said shaft for rotating it, a gear on said shaft, a second gear journaled to rotate on a stationary axis on said frame, one of said gears having a pitch surface of substantially spherical curvature and being located with its center substantially in the axis of oscillation of said lever, whereby said gears will be in mesh with each other regardless of the position of said hand-lever, and means actuated by said gears for steering the vehicle.

Signed at Geneva, this 7th day of June 1909.

JOEL NILES WHEELER.

Witnesses:
 WM. GAYLORD,
 MABEL A. ANDERSON.